(12) United States Patent
Cai et al.

(10) Patent No.: US 11,067,596 B2
(45) Date of Patent: Jul. 20, 2021

(54) METHOD FOR CALIBRATING PHASE-FREQUENCY CHARACTERISTIC OF LOW FREQUENCE ACCELEROMETER BASED ON TIME-SPATIAL SYNCHRONIZATION

(71) Applicants: National Institute of Metrology, China, Beijing (CN); Beijing University of Chemical Technology, Beijing (CN)

(72) Inventors: Chenguang Cai, Beijing (CN); Ming Yang, Beijing (CN); Zhihua Liu, Beijing (CN); Hao Cheng, Beijing (CN); Cuiyun Jin, Beijing (CN)

(73) Assignees: National Institute of Metrology, Beijing (CN); Beijing University of Chemical Technology, Beijing (CN)

( * ) Notice: Subject to any disclaimer, the term of this patent is extended or adjusted under 35 U.S.C. 154(b) by 163 days.

(21) Appl. No.: 16/600,595

(22) Filed: Oct. 14, 2019

(65) Prior Publication Data
US 2021/0109125 A1   Apr. 15, 2021

(51) Int. Cl.
*G01P 21/00*   (2006.01)
*G01P 15/00*   (2006.01)

(52) U.S. Cl.
CPC .............. *G01P 21/00* (2013.01); *G01P 15/00* (2013.01)

(58) Field of Classification Search
CPC ................................. G01P 21/00; G01P 15/00
See application file for complete search history.

(56) References Cited

U.S. PATENT DOCUMENTS

2009/0182521 A1* 7/2009 Sill .................. G01P 21/02
702/104

FOREIGN PATENT DOCUMENTS

CN     1955644 A    5/2007
CN   105259373 A    1/2016

* cited by examiner

*Primary Examiner* — Alexander Satanovsky
*Assistant Examiner* — Mark I Crohn

(57) ABSTRACT

A method for calibrating phase-frequency characteristics of low frequency accelerometer based on time-spatial synchronization, comprises: measuring excitation displacement of the low frequency accelerometer to realize excitation acceleration measurement of the low frequency accelerometer; realizing alignment of the excitation acceleration signal of the low frequency accelerometer with output voltage signal of the low frequency accelerometer in the spatial domain based on TSS technology, fitting the excitation acceleration signal and the output voltage signal respectively by SAM, and calculating phase $\varphi_F$ of the excitation acceleration signal at a zero position of horizontal long-stroke shaker and phase $\varphi_Z$ of the output voltage signal at the time when a zero encoder on the shaker outputs pulse; and calculating the sensitivity phase of the low frequency accelerometer with $\varphi_Z$ and $\varphi_F$, and determining phase-frequency characteristics of the low frequency accelerometer by calibrating the sensitivity phases at different frequencies.

6 Claims, 3 Drawing Sheets

METHOD FOR CALIBRATING PHASE-FREQUENCY CHARACTERISTIC OF LOW FREQUENCE ACCELEROMETER BASED ON TIME-SPATIAL SYNCHRONIZATION

TECHNICAL FIELD

The invention belongs to the technical field of vibration testing and calibration, and particularly, to a method for calibrating phase-frequency characteristic of a low frequency accelerometer.

BACKGROUND OF THE PRESENT INVENTION

Different types (such as piezoelectric, electrochemical, photodynamic, etc.) accelerometers are manufactured to fulfill actual engineering needs better, and the low frequency accelerometer is increasingly being applied to monitor vibration in the fields of earthquakes, wind power, and building structural safety. The frequency characteristics (amplitude-frequency characteristic and phase-frequency characteristic) of the low frequency accelerometer are usually known values in their practical applications, and the frequency characteristics are prerequisites for ensuring accurate and reliable measurement of vibration data. Currently, calibration accuracy for the amplitude-frequency characteristic of the low frequency accelerometer reaches 0.1% at frequencies greater than 0.1 Hz, while calibration accuracy for the phase-frequency characteristic is only 0.5°. The calibration accuracy for the phase-frequency characteristic is not sufficient for certain situations, which has become the key of limiting the accurate measurement with the low frequency accelerometer.

At present, the calibration methods for the phase-frequency characteristic of the low frequency accelerometer include the laser interferometry (LI) recommended by ISO 16063-11 and 16063-41 and the Earth Gravity Method (EG) reported in literature. The LI uses a laser interferometer to measure the excitation acceleration of the low frequency accelerometer under calibration installed on a working surface of a long-stroke shaker. The measured excitation acceleration signal is fitted with the directly collected output voltage signal of the low frequency accelerometer under calibration using SAM to obtain their initial phases. The initial phase difference between the two signals is the sensitivity phase of the low frequency accelerometer under calibration, and its phase-frequency characteristic is determined by calibrating the sensitivity phases of different frequencies. The calibration accuracy for the phase-frequency characteristic is reduced because the LI is affected by the low signal-to-noise ratio of speed signal measured by the interferometer at low frequencies, and the calibration frequency range is limited by the signal-to-noise ratio of the output voltage signal of the low frequency accelerometer under calibration. The EG provides a sinusoidal excitation acceleration of a fixed amplitude and a specific frequency to the low frequency accelerometer under calibration through a gravity generating device, and implements the calibration for the phase-frequency characteristic by using the output pulse signal of a zero encoder on the gravity generating device. This method is limited to calibration in the DC-5 Hz frequency range. The calibration accuracy for the phase-frequency characteristic by the above two methods is about 0.5°, which is obviously insufficient for high-accuracy calibration.

Therefore, the current calibration methods for the phase-frequency characteristic of the low frequency accelerometer have the disadvantages of low calibration accuracy and limited frequency range. For the deficiencies, the invention provides a method for enabling simultaneous calibration for phase-frequency characteristic of multiple low-frequency accelerometers at low-cost, high-flexibility, high-efficiency, high calibration accuracy, a wide frequency range and low frequency (even quasi-static).

SUMMARY OF THE PRESENT INVENTION

The current calibration methods for the phase-frequency characteristic of the low frequency accelerometer have the disadvantages of limited calibration accuracy and limited frequency range. For the deficiencies, the embodiment of the present invention provides a method for calibrating the phase-frequency characteristic of the low frequency accelerometer based on time-spatial synchronization, including:

measuring an excitation acceleration based on a MV method to determine an excitation acceleration signal of the low frequency accelerometer under calibration, including: collecting motion sequence images with a certain number of frames of a high contrast mark, extracting longer edges $l_1$ and $l_2$ of a rectangle on the motion sequence images based on the MV method, and obtaining excitation displacement of the low frequency accelerometer under calibration by calculating displacement of the longer edges $l_1$ and $l_2$ of the rectangle, thereby realizing the excitation acceleration measurement of the low frequency accelerometer under calibration;

aligning the excitation acceleration signal with the spatial domain of the output voltage signal, including: realizing alignment of an excitation acceleration signal of the low frequency accelerometer under calibration with output voltage signal of the low frequency accelerometer under calibration in the spatial domain by determining the excitation acceleration at a zero position of a horizontal long-stroke shaker and a output voltage signal of the low frequency accelerometer under calibration at a time when a zero encoder on the shaker outputs a pulse;

solving phases of the excitation acceleration signal and the output voltage signal at the spatial aligning position, including: fitting the excitation acceleration signal of the low frequency accelerometer under calibration and output voltage signal of the low frequency accelerometer under calibration respectively using the SAM, and calculating the phases of the excitation acceleration signal and the output voltage signal at the spatial aligning position;

determining the phase-frequency characteristic of the low frequency accelerometer under calibration, including: calculating sensitivity phase of the low frequency accelerometer under calibration based on the phases at the spatial aligning position, and determining the phase-frequency characteristic of the low frequency accelerometer under calibration by calibrating the sensitivity phases at different frequencies.

Further, the operation for obtaining the excitation displacement measurement of the low frequency accelerometer under calibration by extracting the longer edges $l_1$ and $l_2$ of the rectangular on the motion sequence images of the high contrast mark based on the MV method and calculating the displacement of the longer edges $l_1$ and $l_2$ of the rectangular specifically includes:

(1) collecting the motion sequence images of the high contrast mark;

where the high contrast mark and the low frequency accelerometer under calibration are fastened to the working surface of the horizontal long-stroke shaker, the motion directions of the sensitive axis of the low frequency accelerometer under calibration and the two longer edges $l_1$ and $l_2$ of the rectangle on the high contrast mark are in the same direction of the motion direction of the working surface, and the two longer edges $l_1$ and $l_2$ of the rectangle on the high contrast mark have the same excitation displacement as the low frequency accelerometer under calibration;

and where a camera collects N motion sequence images of the high contrast mark with sufficient period at a frame rate satisfying the Nyquist sampling theorem, and the high contrast mark in motion period fills the entire field of view of the camera;

(2) detecting a sub-pixel edge of the motion sequence images;

where the motion sequence images $F_j(x, y)$ of the high contrast mark are collected, the value of the subscript j being 1, 2, L, N, in order to avoid the influence of similar edges on the images on the detection for the longer edges of the rectangle, a series of circular templates $\{T_i\}$ of different sizes are selected to accurately match circles of different sizes on $F_j(x, y)$ at different shooting distances, and the matching is realized by a correlation coefficient $R_i(x, y)$ calculated by the following formula with the region on $F_j(x, y)$ having the maximum $R_i(x, y)$ being the matched circle:

$$R_i(x, y) = \frac{\sum_{u=1}^{U}\sum_{v=1}^{V} P(x+u, y+v)Q(u, v)}{\sqrt{\sum_{u=1}^{U}\sum_{v=1}^{V}[P(x+u, y+v)]^2 \sum_{u=1}^{U}\sum_{v=1}^{V}[Q(u, v)]^2}}$$

where, $$\begin{cases} P(x+u, y+v) = F_j(x+u, y+v) - \overline{F}_j \\ Q(u, v) = T_i(u, v) - \overline{T}_i \end{cases}$$

$R_i(x, y)$ is the correlation coefficient for $F_j(x, y)$ at the pixel $(x, y)$, U and V are the row and column of the template $T_i$ respectively, $\overline{F}_j$ and $\overline{T}_i$ are the average gray values of $F_j(x, y)$ and $T_i$ respectively, the ROI only containing a rectangle is determined using the centers of the matched four circles, the longer edges $(x_c, y_c)$ of the rectangle inside the ROI are extracted by the Canny operator, and the gray gradients in the neighborhood of the longer edges of the rectangle in the horizontal motion direction are fitted by using the Gaussian function as follows:

$$Grad_j(p) = A_j \exp\left(-\frac{[x_j(p) - x_{j,sub}]^2}{2\sigma_j^2}\right)$$

where $x_j(p) \in [x_c - \Delta x, x_c + \Delta x]$ is the horizontal coordinate of the selected pixel, $\Delta x$ is the selected coordinate range, $x_{j,sub}$ is the sub-pixel coordinate of $x_c$, $Grad_j(p)$ is the corresponding gray gradient, $A_j$ and $\sigma_j$ are the fitted amplitude and standard deviation respectively, the sub-pixel coordinate of a point in the longer edges of the rectangle on the extracted motion sequence images is $\{x_{j,sub}, y_j\}$, where $y_j$ is the vertical coordinate extracted by the Canny operator;

(3) the excitation displacement of the low frequency accelerometer under calibration;

where the fitted straight line $\{l_{j,1}, l_{j,2}\}$ of the longer edges is obtained by converting the sub-pixel coordinates of the points in the longer edges into corresponding world coordinates based on the correspondence between the image pixel coordinates determined by the camera criterion and the world coordinates and fitting the world coordinates of the two longer edges by least squares method respectively; the longer edges $\{l_{r,1}, l_{r,2}\}$ of the rectangle when the working surface of the horizontal long-stroke shaker passes through the zero position is selected as the reference edges, and the displacement between $\{l_{j,1}, l_{j,2}\}$ and $\{l_{r,1}, l_{r,2}\}$ is calculated; then the displacement $\overline{d}_j$ from $F_j(x, y)$ to $F_r(x, y)$ is obtained as follows:

$$\overline{d}_j = (d_{j,1} + d_{j,2})/2,$$

further, the excitation acceleration $a_j$ of the low frequency accelerometer under calibration is calculated with the excitation displacement as follows:

$$a_j = \omega_v^2 \overline{d}_j$$

where $\omega_v$ is the vibration angle frequency;

further, the operation for aligning the excitation acceleration signal of the low frequency accelerometer under calibration and output voltage signal of the low frequency accelerometer under calibration in the spatial domain specifically includes:

aligning the excitation acceleration signal and the output voltage signal in the spatial domain by determining the excitation acceleration of the low frequency accelerometer under calibration at the zero position of the horizontal long-stroke shaker and the output voltage signal of the low frequency accelerometer under calibration at the time when the zero encoder on the shaker outputs the pulse;

further, the excitation acceleration signal of the low frequency accelerometer under calibration and output voltage signal of the low frequency accelerometer under calibration are fitted using the SAM by the following formula respectively:

$$\begin{cases} a_j(t_j) = A_V \cos(\omega_v t_j) - B_V \sin(\omega_v t_j) + C_V t_j + D_V \\ u(t_k) = A_u \cos(\omega_v t_k) - B_u \sin(\omega_v t_k) + C_u t_k + D_u \end{cases}$$

where $t_j$ and $t_k$ are the sampling times for the high contrast mark image and the output voltage signal of the low frequency accelerometer, the subscript k=1, 2, L, K, K is the number of sampling points of the output voltage signal, the parameters $A_V$, $B_V$, $C_V$, and $D_V$, $A_u$, $B_u$, $C_u$, and $D_u$ are obtained by solving N and K formulas respectively; then the phase $\varphi_F$ of the excitation acceleration at the zero position of the working surface of the horizontal long-stroke shaker is:

$$\varphi_F = \arcsin\left[\frac{a(t_Z) + D_V}{\sqrt{A_V^2 + B_V^2}}\right] \times 180/\pi$$

where $a(t_Z)$ is the acceleration at the zero position of the working surface of the horizontal long-stroke shaker, $t_Z$ is the time when the zero encoder on the shaker outputs the pulse; the phase $\varphi_Z$ of the output voltage signal of the low frequency accelerometer under calibration at the time $t_Z$ is:

$$\varphi_Z = \arcsin[\arctan(B_u/A_u) + \omega_v t_Z] \times 180/\pi$$

further, the sensitivity phase $\varphi_p$ of the low frequency accelerometer under calibration is:

$$\varphi_p = \varphi_Z - \varphi_F$$

where the sensitivity phase is the average of $\varphi_p$ at the spatial aligning positions during entire collection, and the phase-frequency characteristic of the low frequency accelerometer under calibration are determined by calibrating the sensitivity phases of the low frequency accelerometer under calibration at different frequencies.

The method for calibrating the phase-frequency characteristic of the low frequency accelerometer of the invention has the following beneficial effects.

(1) The method of the invention has the advantages of simple calibration process, wide frequency range, low frequency, high accuracy, and ability of simultaneous calibration for multiple low frequency accelerometers;

(2) The method of the invention utilizes the MV method and the time-spatial synchronization technology to realize the calibration for the phase-frequency characteristic of the low frequency accelerometer, which is suitable for different types and models of low frequency accelerometers.

(3) The method of the invention can realize the calibration for the phase-frequency characteristic of the low frequency accelerometer with the frequency lower than that of the LI method and higher than that of the EG method, so as to meet the calibration for the phase-frequency characteristic of the low frequency accelerometer in a wide frequency range.

Abbreviations

MV: monocular vision method to realize the measurement of the excitation acceleration of the low frequency accelerometer under calibration;

SAM: sinusoidal approximation method for fitting the excitation acceleration signal of the low frequency accelerometer under calibration and output voltage signal of the low frequency accelerometer under calibration;

TSS: time-spatial synchronization method to realize the alignment of the excitation acceleration signal and the output voltage signal in spatial domain;

ROI: a region of interest for defining the longer edges region of a rectangle on a feature mark;

LI: laser interferometry for calibrating the phase-frequency characteristic of the low frequency accelerometer;

EG: earth gravity method, which can be used to calibrate the phase-frequency characteristic of the low frequency accelerometer.

DETAILED DESCRIPTION OF THE PRESENT INVENTION

The present invention provides a method for calibrating phase-frequency characteristic of a low frequency accelerometer. The present invention will be described in detail below with reference to the accompanying drawings and specific embodiments, so that those skilled in the art can better understand the calibration method of the present invention.

Figure 1:
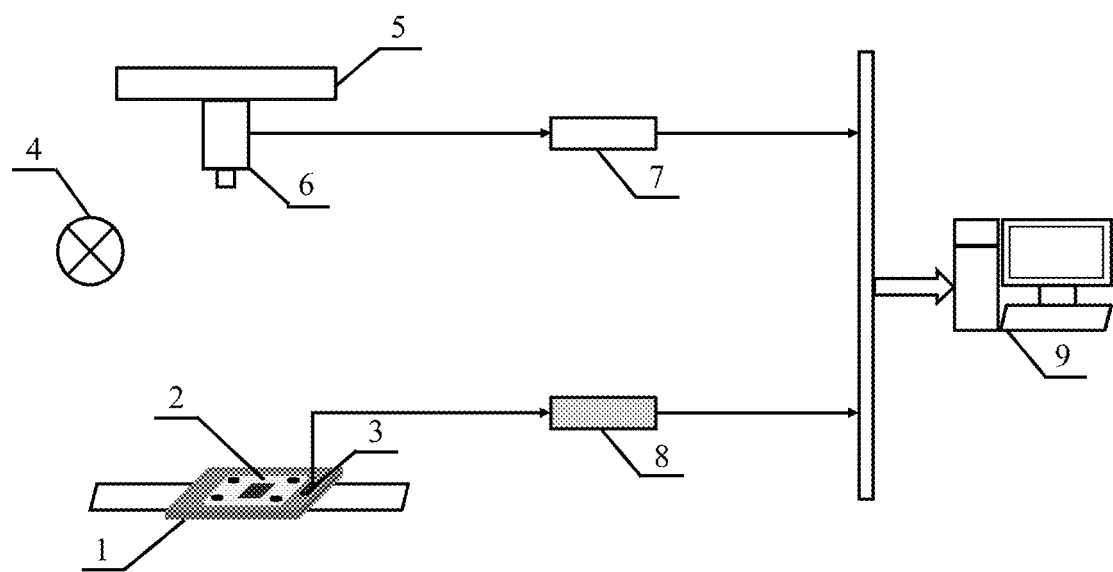
FIG. 1 is a diagram of an apparatus for calibrating phase-frequency characteristic of a low frequency accelerometer based on time-spatial synchronization.

FIG. 1 is a diagram of an apparatus for calibrating phase-frequency characteristic of a low frequency accelerometer based on time-spatial synchronization. The apparatus includes a horizontal long-stroke shaker (1), a high contrast mark (2), a low frequency accelerometer under calibration (3), and a light source (4), a camera fixing device (5), a camera (6), an image transmission device (7), a voltage signal collection and transmission device (8), a processing and display device (9), a zero encoder (10) on the shaker. The zero encoder (10) on the shaker is placed below the working surface of the shaker. The horizontal long-stroke shaker (1) provides excitation acceleration for the low frequency accelerometer under calibration (3); the high contrast mark (2) and the low frequency accelerometer under calibration (3) are fastened to the working surface of the horizontal long-stroke shaker (1); the light source (4) provides illumination for the camera (6); the camera fixing device (5) is used to fix the camera (6) such that its optical axis is perpendicular to the working surface of the horizontal long-stroke shaker (1); the camera (6) collects the motion sequence images of the high contrast mark (2); the image transmission device (7) transmits the collected motion sequence images; the voltage signal collection and transmission device (8) is used to collect and transmit the output voltage signal of the low frequency accelerometer under calibration (3); and the processing and display device (9) processes the collected motion sequence images and output voltage signal, and saves and displays the calibration result.

Figure 2:
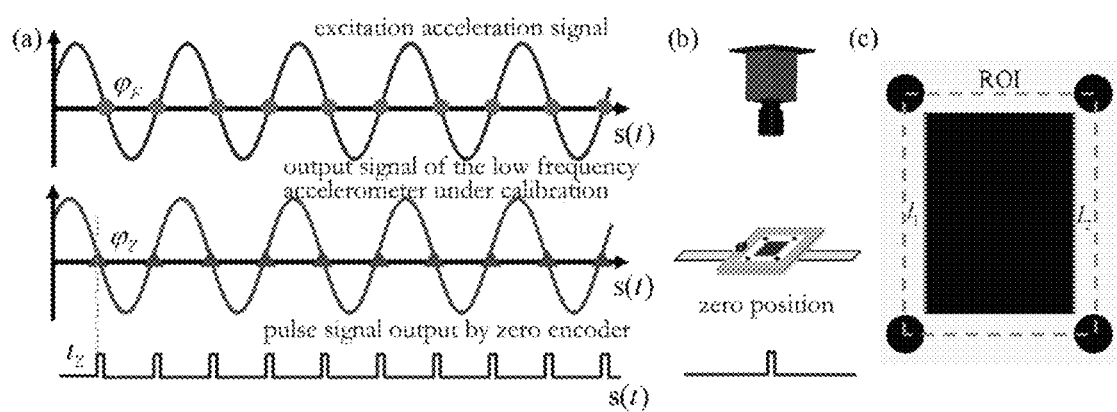
FIG. 2 is a schematic block diagram of a method for calibrating the phase-frequency characteristic of the low frequency accelerometer based on time-spatial synchronization.

FIG. 2 is the schematic block diagram for calibrating the phase-frequency characteristic of the low frequency accelerometer based on time-spatial synchronization, mainly including the following steps.

The method based on MV for measuring the excitation acceleration of the low frequency accelerometer specifically includes:

(1) determining the ROI of the motion sequence image of the high contrast mark; in order to stably and accurately extract longer edges of a rectangle on the motion sequence images of the high contrast mark, selecting a series of circular templates $\{T_i\}$ of different sizes for matching the ROI on images at different shooting distances only containing the rectangular. The correlation coefficient $R_i(x, y)$ is defined as:

$$R_i(x, y) = \frac{\sum_{u=1}^{U}\sum_{v=1}^{V} P(x+u, y+v)Q(u, v)}{\sqrt{\sum_{u=1}^{U}\sum_{v=1}^{V}[P(x+u, y+v)]^2 \sum_{u=1}^{U}\sum_{v=1}^{V}[Q(u, v)]^2}} \quad (1)$$

$$\text{where} \begin{cases} P(x+u, y+v) = F_j(x+u, y+v) - \overline{F}_j \\ Q(u, v) = T_i(u, v) - \overline{T}_i \end{cases} \quad (2)$$

$R_i(x, y)$ is the correlation coefficient of $F_j(x, y)$ at pixel $(x, y)$, U and V are the row and column of the template $T_i$ respectively, and $\overline{F}_j$ and $\overline{T}_i$ are the average gray values of $F_j(x, y)$ and $T_i$ respectively, the ROI only containing the rectangle can be determined using the centers of the matched four circles;

(2) extracting the point $(x_c, y_c)$ in the longer edges of the rectangle in the ROI by the Canny operator, and fitting the gray gradient in the neighborhood of the longer edges of the rectangle in the horizontal motion direction using the Gaussian function as follows:

$$Grad_j(p) = A_j \exp\left(-\frac{[x_j(p) - x_{j,sub}]^2}{2\sigma_j^2}\right) \quad (3)$$

where $x_j(p) \in [x_c - \Delta x, x_c + \Delta x]$ is the horizontal coordinate of the selected pixel, $\Delta x$ is the size of selected coordinate range, $x_{j,sub}$ is the sub-pixel coordinate of $x_c$, $Grad_j(p)$ is the corresponding gray gradient, $A_j$ and $\sigma_j$ are the fitted amplitude and standard deviation respectively, the sub-pixel coordinate of a point in the longer edges of the extracted rectangle is $\{x_{j,sub}, y_j\}$, where $y_j$ is the vertical coordinate extracted by the Canny operator;

(3) obtaining the fitted straight line $\{l_{j,1}, l_{j,2}\}$ of the longer edges by converting the sub-pixel coordinates of the points in the longer edges into corresponding world coordinates based on the correspondence between the image pixel coordinates determined by the camera criterion and the world coordinates and fitting the world coordinates of the two longer edges by least squares method respectively; selecting the edges $\{l_{r,1}, l_{r,2}\}$ when the working surface of the horizontal long-stroke shaker passes through the zero position as the reference edges, and calculating a displacement between $\{l_{j,1}, l_{j,2}\}$ and $\{l_{r,1}, l_{r,2}\}$; then a displacement $\overline{d}_j$ from $F_j(x, y)$ to $F_r(x, y)$ being obtained as follows:

$$\overline{d}_j = (d_{j,1} + d_{j,2})/2, \quad (4)$$

(4) solving the excitation acceleration $a_j$ by the second-order differential of the excitation displacement of the low frequency accelerometer under calibration:

$$a_j = \omega_v^2 \overline{d}_j \quad (5)$$

where $\omega_v$ is the vibration angular frequency.

The method for calibrating the phase-frequency characteristic of the low frequency accelerometer based on time-spatial synchronization specifically includes:

(5) fitting the excitation acceleration signal of the low frequency accelerometer under calibration and output voltage signal of the low frequency accelerometer under calibration using the SAM respectively:

$$\begin{cases} a_j(t_j) = A_V \cos(\omega_v t_j) - B_V \sin(\omega_v t_j) + C_V t_j + D_V \\ u(t_k) = A_u \cos(\omega_v t_k) - B_u \sin(\omega_v t_k) + C_u t_k + D_u \end{cases} \quad (6)$$

where $t_j$ and $t_k$ are the sampling times for the high contrast mark image and the output voltage signal of the low frequency accelerometer, the subscript k=1, 2, L, K, K is the number of sampling points of the output voltage signal, the parameters $A_V$, $B_V$, $C_V$, and $D_V$, $A_u$, $B_u$, $C_u$, and $D_u$ are obtained by solving N and K formulas respectively; then the phase $\varphi_F$ of the excitation acceleration at the zero position of the working surface of the horizontal long-stroke shaker is:

$$\varphi_F = \arcsin\left[\frac{a(t_Z) + D_V}{\sqrt{A_V^2 + B_V^2}}\right] \times 180/\pi \quad (7)$$

where $a(t_Z)$ is the acceleration at the zero position of the working surface of the horizontal long-stroke shaker, $t_Z$ is the time when the zero encoder on the shaker outputs the pulse; the phase $\varphi_Z$ of the output voltage signal of the low frequency accelerometer under calibration at the time $t_Z$ is:

$$\varphi_Z = \arcsin[\arctan(B_u/A_u) + \omega_v t_Z] \times 180/\pi \quad (8)$$

(6) The sensitivity phase $\varphi p$ of the low frequency accelerometer under calibration is:

$$\varphi_P = \varphi_Z - \varphi_F \quad (9)$$

where the sensitivity phase is the average of $\varphi_p$ at the spatial aligning positions during entire collection, and the phase-frequency characteristic of the low frequency accelerometer under calibration are determined by calibrating the sensitivity phases of the low frequency accelerometer under calibration at different frequencies.

Figure 3:
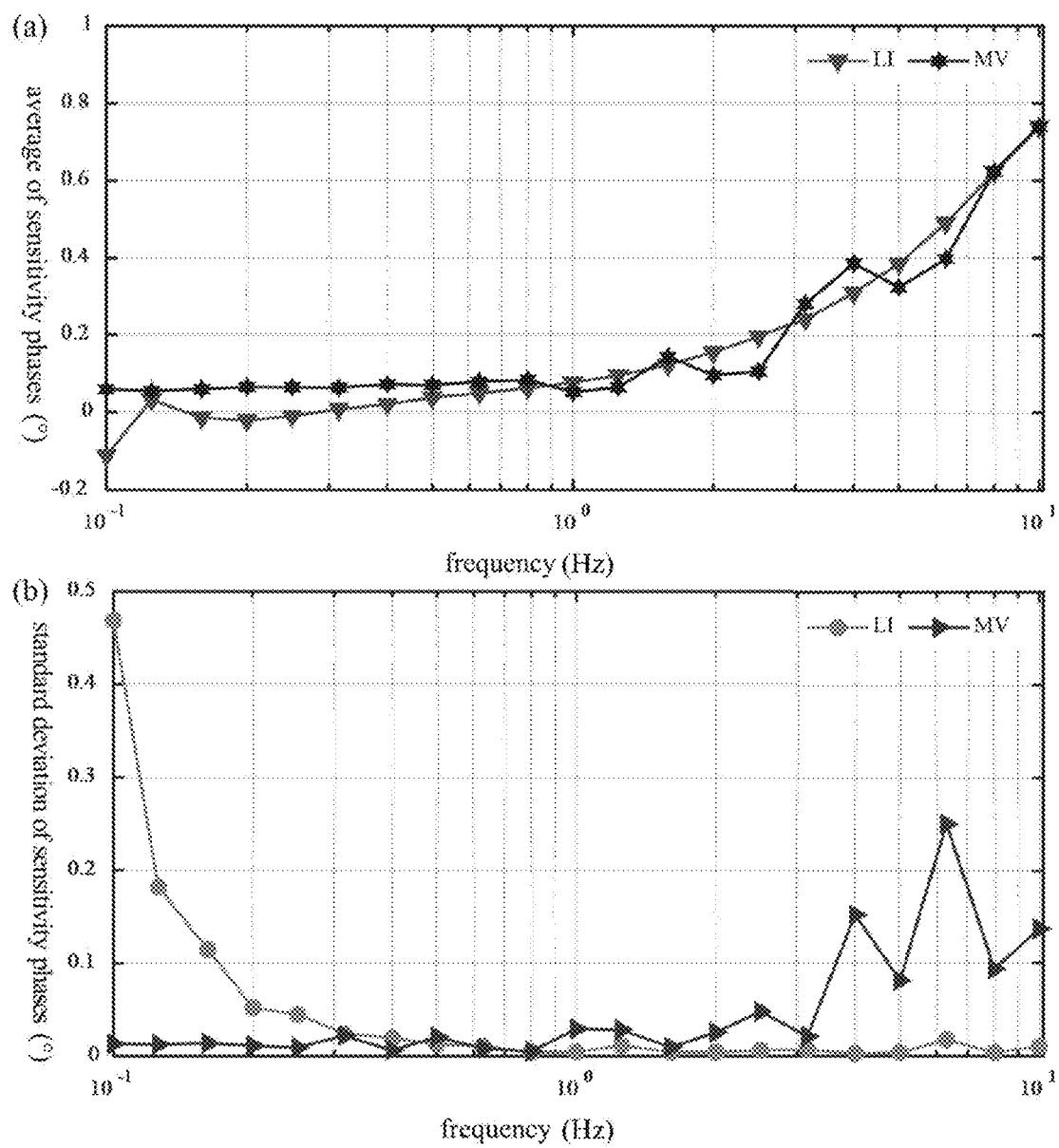
FIG. 3 is a diagram showing experimental results of calibrating the phase-frequency characteristic of the low frequency accelerometer according to a specific embodiment of the method of the present invention.

FIG. 3 is a diagram showing experimental results of calibrating the phase-frequency characteristic of the low frequency accelerometer according to a specific embodiment of the method of the present invention. The specific parameters of the apparatus of the present embodiment are: the horizontal long-stroke shaker ESZ185-400 with maximum stroke of 400 mm and frequency range of 0.01-200 Hz, the low frequency accelerometer MSV 3100A-02 with frequency range of DC-250 Hz, the high contrast mark with circle radius of 15 mm, rectangular size of 40 mm×60 mm, the CMOS camera OS10-V3-4K with a maximum resolution of 9 megapixels and a maximum frame rate of 1000 fps, the voltage signal collection device INV 3062C with a maximum sampling frequency of 216 kHz. In this experiment, the frequency calibration with taken points of ⅓-range frequency in the range of 0.1-10 Hz is achieved, and the sensitivity phase of the low frequency accelerometer is calibrated 10 times for each frequency point. Meanwhile, LI is also used to calibrate the sensitivity phase 10 times for each frequency point. It can be seen from the experimental results that the calibration method of the present invention realizes calibrating for the phase-frequency characteristic of the low frequency accelerometer in the range of 0.1-10 Hz with the maximum standard deviation of 0.250° smaller than the maximum standard deviation of 0.470° in the case of LI. The highly similar calibration results for the phase-frequency characteristic between the MV method and LI verify the calibration accuracy for the phase-frequency characteristic with the MV method.

The above detailed description is a specific embodiment of the method of the present invention, so as to be understood by those skilled in the art, and is not intended to limit the scope of application of the present invention. A person skilled in the art can make a series of optimizations, improvements and equivalent modifications and the like on the basis of the present invention. Therefore, the scope of the invention should be defined by the appended claims.

What is claimed is:

1. A method for calibrating phase-frequency characteristic of a low frequency accelerometer based on time-spatial synchronization, comprising:

collecting motion sequence images with a given number of frames of a high contrast mark, extracting longer edges $l_1$ and $l_2$ of a rectangle on the motion sequence images based on a MV method, and obtaining excitation displacement of the low frequency accelerometer under calibration by calculating displacement of the longer edges $l_1$ and $l_2$ of the rectangle, thereby measuring excitation acceleration of the low frequency accelerometer under calibration;

aligning an excitation acceleration signal of the low frequency accelerometer under calibration with a output voltage signal of the low frequency accelerometer under calibration in spatial domain by determining the excitation acceleration at a zero position of a horizontal long-stroke shaker and a output voltage signal of the low frequency accelerometer under calibration at a time when a zero encoder on the shaker outputs a pulse;

fitting the excitation acceleration signal of the low frequency accelerometer under calibration and the output voltage signal of the low frequency accelerometer under calibration respectively using SAM, and calculating phases of the excitation acceleration signal and the output voltage signal at a spatial aligning position; and calculating a sensitivity phase of the low frequency accelerometer under calibration based on the phases at the spatial aligning position, and determining the phase-frequency characteristic of the low frequency accelerometer under calibration by calibrating the sensitivity phases at different frequencies.

2. The method for calibrating the phase-frequency characteristic of the low frequency accelerometer based on time-spatial synchronization according to claim 1, wherein extracting longer edges $l_1$ and $l_2$ of a rectangle on the motion sequence images based on a MV method and obtaining excitation displacement of the low frequency accelerometer under calibration by calculating displacement of the longer edges $l_1$ and $l_2$ of the rectangle comprises:

(1) collecting the motion sequence images of the high contrast mark; wherein:

the high contrast mark and the low frequency accelerometer under calibration are fastened to a working surface of the horizontal long-stroke shaker, motion directions of a sensitive axis of the low frequency accelerometer under calibration and the two longer edges $l_1$ and $l_2$ of the rectangle on the high contrast mark are in a same direction as the working surface, and the two longer edges $l_1$ and $l_2$ of the rectangle on the high contrast mark have a same excitation displacement as the low frequency accelerometer under calibration; and a camera collects N motion sequence images of the high contrast mark with sufficient period at a frame rate satisfying Nyquist sampling theorem, and the high contrast mark in motion period fills entire field of view of the camera;

(2) detecting a sub-pixel edge of the motion sequence images;

wherein motion sequence images $F_j(x, y)$ of the high contrast mark are collected, subscript j being 1, 2, L, N, in order to preventing similar edges on the images from influencing detection of the longer edges of the rectangle, a series of circular templates $\{T_i\}$ of different sizes are selected, to accurately match circles of different sizes on $F_j(x, y)$ at different shooting distances by a correlation coefficient $R_i(x, y)$ calculated by the following formula, with region on $F_j(x, y)$ having a maximum $R_i(x, y)$ being the matched circle:

$$R_i(x, y) = \frac{\sum_{u=1}^{U}\sum_{v=1}^{V} P(x+u, y+v)Q(u, v)}{\sqrt{\sum_{u=1}^{U}\sum_{v=1}^{V}[P(x+u, y+v)]^2 \sum_{u=1}^{U}\sum_{v=1}^{V}[Q(u, v)]^2}}$$

wherein, $$\begin{cases} P(x+u, y+v) = F_j(x+u, y+v) - \overline{F}_j \\ Q(u, v) = T_i(u, v) - \overline{T}_i \end{cases}$$

$R_i(x, y)$ is the correlation coefficient for $F_j(x, y)$ at a pixel (x, y), U and V are row and column of the template $T_i$ respectively, $\overline{F}_j$ and $\overline{T}_i$ are average gray values of $F_j(x, y)$ and $T_i$ respectively; ROI only containing a rectangle is determined using centers of the matched four circles, the longer edges $(x_c, y_c)$ of the rectangle inside the ROI are extracted by Canny operator, and the gray gradients in a neighborhood of the longer edges of the rectangle in a horizontal motion direction are fitted by using Gaussian function as follows:

$$Grad_j(p) = A_j \exp\left(-\frac{[x_j(p) - x_{j,sub}]^2}{2\sigma_j^2}\right)$$

$x_j(p) \in [x_c - \Delta x, x_c + \Delta x]$ is a horizontal coordinate of the selected pixel, $\Delta x$ is a selected coordinate range, $x_{j,sub}$ is a sub-pixel coordinate of $x_c$, $Grad_j(p)$ is a corresponding gray gradient, $A_j$ and $\sigma_j$ are fitted amplitude and standard deviation respectively, the sub-pixel coordinate of a point in the longer edges of the rectangle on the extracted motion sequence images is $\{x_{j,sub}, y_j\}$, wherein $y_j$ is a vertical coordinate extracted by the Canny operator;

(3) calculating the excitation displacement of the low frequency accelerometer under calibration;

wherein fitted straight line $\{l_{j,1}, l_{j,2}\}$ of the longer edges is obtained by converting the sub-pixel coordinates of the points in the longer edges into corresponding world coordinates based on a correspondence between the image pixel coordinates determined by a camera criterion and the world coordinates and fitting the world coordinates of the two longer edges by least squares method respectively; the longer edges $\{l_{r,1}, l_{r,2}\}$ of the rectangle when the working surface of the horizontal long-stroke shaker passes through the zero position is selected as a reference edges, and the displacement between $\{l_{j,1}, l_{j,2}\}$ and $\{l_{r,1}, l_{r,2}\}$ is calculated; then the displacement $\overline{d}_j$ from $F_j(x, y)$ to $F_r(x, y)$ is obtained as follows:

$$\overline{d}_j = (d_{j,1} + d_{j,2})/2.$$

3. The method for calibrating the phase-frequency characteristic of the low frequency accelerometer based on time-spatial synchronization according to claim 2, wherein the excitation acceleration $a_j$ of the low frequency accelerometer under calibration is calculated with the excitation displacement as follows:

$$a_j = \omega_v^2 \overline{d}_j,$$

$\omega_v$ is a vibration angle frequency.

4. The method for calibrating the phase-frequency characteristic of the low frequency accelerometer based on time-spatial synchronization according to claim 1, wherein aligning the excitation acceleration signal of the low frequency accelerometer under calibration and the output voltage signal of the low frequency accelerometer under calibration in the spatial domain comprises:

aligning the excitation acceleration signal and the output voltage signal in the spatial domain by determining the excitation acceleration of the low frequency accelerometer under calibration at the zero position of the horizontal long-stroke shaker and the output voltage signal of the low frequency accelerometer under calibration at the time when the zero encoder on the shaker outputs the pulse.

5. The method for calibrating the phase-frequency characteristic of the low frequency accelerometer based on time-spatial synchronization according to claim 1, wherein the excitation acceleration signal of the low frequency accelerometer under calibration and the output voltage signal of the low frequency accelerometer under calibration are fitted using SAM by the following formula respectively:

$$\begin{cases} a_j(t_j) = A_V\cos(\omega_v t_j) - B_V\sin(\omega_v t_j) + C_V t_j + D_V \\ u(t_k) = A_u\cos(\omega_v t_k) - B_u\sin(\omega_v t_k) + C_u t_k + D_u \end{cases}$$

wherein $t_j$ and $t_k$ are times when sampling the high contrast mark image and the output voltage signal of the low frequency accelerometer, subscript k=1, 2, L, K, K is number of sampling points of the output voltage signal, the parameters $A_V$, $B_V$, $C_V$, and $D_V$, $A_u$, $B_u$, $C_u$, and $D_u$ are obtained by solving N and K formulas respectively; then phase $\varphi_F$ of the excitation acceleration at the zero position of the working surface of the horizontal long-stroke shaker is:

$$\varphi_F = \arcsin\left[\frac{a(t_Z) + D_V}{\sqrt{A_V^2 + B_V^2}}\right] \times 180/\pi$$

wherein $a(t_Z)$ is the acceleration at the zero position of the working surface of the horizontal long-stroke shaker, $t_Z$ is the time when the zero encoder on the shaker outputs the pulse; phase $\varphi_Z$ of the output voltage signal of the low frequency accelerometer under calibration at the time $t_Z$ is:

$$\varphi_Z = \arcsin[\arctan(B_u/A_u) + \omega_v t_Z] \times 180/\pi.$$

6. The method for calibrating the phase-frequency characteristic of the low frequency accelerometer based on time-spatial synchronization according to claim 1, wherein the sensitivity phase $\varphi_p$ of the low frequency accelerometer under calibration is:

$$\varphi_p = \varphi_Z - \varphi_F$$

the sensitivity phase is an average of $\varphi_p$ at spatial aligning positions during entire collection, and the phase-frequency characteristic of the low frequency accelerometer under calibration are determined by calibrating the sensitivity phases of the low frequency accelerometer under calibration at different frequencies.

* * * * *